United States Patent
Okamoto et al.

(10) Patent No.: US 10,473,193 B2
(45) Date of Patent: Nov. 12, 2019

(54) CONTROL METHOD FOR VARIABLE SPEED ELECTRIC MOTOR SYSTEM AND CONTROL DEVICE FOR VARIABLE SPEED ELECTRIC MOTOR SYSTEM

(71) Applicant: MITSUBISHI HEAVY INDUSTRIES COMPRESSOR CORPORATION, Tokyo (JP)

(72) Inventors: Yoshiyuki Okamoto, Hiroshima (JP); Yasushi Mori, Hiroshima (JP)

(73) Assignee: MITSUBISHI HEAVY INDUSTRIES COMPRESSOR CORPORATION, Tokyo (JP)

( * ) Notice: Subject to any disclaimer, the term of this patent is extended or adjusted under 35 U.S.C. 154(b) by 114 days.

(21) Appl. No.: 15/756,945

(22) PCT Filed: Sep. 4, 2015

(86) PCT No.: PCT/JP2015/075183
§ 371 (c)(1),
(2) Date: Mar. 1, 2018

(87) PCT Pub. No.: WO2017/037940
PCT Pub. Date: Mar. 9, 2017

(65) Prior Publication Data
US 2018/0252300 A1 Sep. 6, 2018

(51) Int. Cl.
*F16H 3/72* (2006.01)
*F16H 61/02* (2006.01)
(Continued)

(52) U.S. Cl.
CPC .............. *F16H 3/728* (2013.01); *B60K 6/485* (2013.01); *F16H 3/72* (2013.01); *F16H 3/727* (2013.01);
(Continued)

(58) Field of Classification Search
CPC ............. B60W 10/08; B60W 30/1882; B60W 2510/104; B60W 2710/081;
(Continued)

(56) References Cited

U.S. PATENT DOCUMENTS 7,223,199 B2 * 5/2007 Willmot ................... B60K 6/36
475/269
8,525,463 B2 * 9/2013 Hioka ................... F02D 41/222
318/13
(Continued)

FOREIGN PATENT DOCUMENTS

EP 0138739 A1 5/1985
JP S59-070497 A 4/1984
(Continued)

OTHER PUBLICATIONS

Written Opinion issued in corresponding PCT Application No. PCT/JP2015/075183 dated Dec. 8, 2015 (8 pages).
(Continued)

*Primary Examiner* — Roger L Pang
(74) *Attorney, Agent, or Firm* — Osha Liang LLP

(57) ABSTRACT

A control method of a variable speed electric motor system, which includes an electric device and a planetary gear transmission device, the control method includes: a step of accepting an instruction for a number of rotations of an output shaft; a step of calculating a number of rotations of a variable speed electric motor based on the number of rotations of the output shaft; a step of determining whether the calculated number of rotations of the variable speed electric motor is in an uncontrollable range; and a step of performing uncontrollable speed range operation for repeatedly and alternately performing a forward direction minimum rotation number instruction for driving the variable speed electric motor at a minimum number of rotations in a forward direction, and a reverse direction minimum rotation
(Continued)

number instruction for driving the variable speed electric motor at a minimum number of rotations in a reverse direction.

3 Claims, 6 Drawing Sheets

(51) Int. Cl.
  *H02P 5/747*   (2006.01)
  *B60K 6/485*   (2007.10)
  *F16H 61/662*   (2006.01)
  *B60K 1/02*   (2006.01)
  *B60W 10/08*   (2006.01)
  *B60W 30/188*   (2012.01)
  *B60L 1/00*   (2006.01)

(52) U.S. Cl.
  CPC .......... *F16H 61/02* (2013.01); *F16H 61/0246* (2013.01); *F16H 61/66254* (2013.01); *H02P 5/747* (2013.01); *B60K 1/02* (2013.01); *B60L 1/003* (2013.01); *B60W 10/08* (2013.01); *B60W 30/1882* (2013.01); *B60W 2510/104* (2013.01); *B60W 2710/081* (2013.01); *Y02T 10/6226* (2013.01); *Y10T 477/34* (2015.01); *Y10T 477/347* (2015.01)

(58) Field of Classification Search
CPC ... Y10T 477/344; Y10T 477/347; B60K 1/02; F16H 3/727; H02P 5/747
USPC ......................................................... 475/150
See application file for complete search history.

(56) References Cited

U.S. PATENT DOCUMENTS

2005/0113201 A1  5/2005 Kimura et al.
2012/0283061 A1* 11/2012 Karlsson .................. B60K 1/00
                  475/150

FOREIGN PATENT DOCUMENTS

JP    4472350 B2  6/2010
WO  03/071160 A1  8/2003

OTHER PUBLICATIONS

International Search Report issued in corresponding PCT Application No. PCT/JP2015/075183 dated Dec. 8, 2015 (4 pages).

* cited by examiner

AXIAL DIRECTION
INPUT SIDE ←——→ OUTPUT SIDE

CONTROL METHOD FOR VARIABLE SPEED ELECTRIC MOTOR SYSTEM AND CONTROL DEVICE FOR VARIABLE SPEED ELECTRIC MOTOR SYSTEM

TECHNICAL FIELD

The present invention relates to a control method of a variable speed electric motor system and a control device thereof.

BACKGROUND ART

As a device for driving a rotary machine such as a compressor, there is a device having an electric device that generates rotational driving force and a transmission device that changes the speed of the rotational driving force generated by the electric device and transmits the result to the rotary machine.

Patent Literature 1 discloses a device in which a constant speed electric motor and a variable speed electric motor for variable speed are used as an electric device and a planetary gear transmission device is used as a transmission device, in order to accurately control a gear ratio. In this device, it is possible to change the number of rotations (a rotational speed) of an output shaft of the transmission device connected to a rotary machine by changing the number of rotations of the variable speed electric motor.

CITATION LIST

Patent Literature

[Patent Literature 1]
Japanese Patent No. 4472350

For example, when an induction motor having 3 phases is used as a variable speed electric motor, it is possible to rotate the variable speed electric motor forward and backward by using a circuit for switching a connected power line. That is, the number of rotations of the variable speed electric motor is changed and its rotation direction is changed, so that it is possible to change the number of rotations of the variable speed electric motor from a maximum number of rotations in a forward direction to a maximum number of rotations in a reverse direction. In this way, it is possible to widen a variable speed range of a variable speed electric motor system having the variable speed electric motor.

Meanwhile, it is necessary to allow the number of rotations of the variable speed electric motor to be in the vicinity of 0 rpm according to the number of rotations of an instructed output shaft. However, when an induction motor is used as the variable speed electric motor, it is not possible to hold the number of rotations in the vicinity of 0 rpm. Thus, there is a case where it is not possible to achieve the number of rotations of the instructed output shaft.

SUMMARY OF INVENTION

One or more embodiments of the present invention provide a control method of a variable speed electric motor system and a control device thereof, by which it is possible to increase the degree of freedom of the number of rotations of an output shaft of a transmission device in the variable speed electric motor system including an electric device having a constant speed electric motor and a variable speed electric motor, and a planetary gear transmission device that changes the speed of rotational driving force generated by the electric device and transmits the result to an object to be driven.

According to one or more embodiments of the present invention, a control method of a variable speed electric motor system, which includes an electric device for generating rotational driving force and a transmission device for changing a speed of the rotational driving force generated by the electric device and transmits the changed rotational driving force to an object to be driven, the control method includes: a step of accepting an instruction for a number of rotations of an output shaft; a step of calculating a number of rotations of a variable speed electric motor based on the number of rotations of the output shaft; a step of determining whether the calculated number of rotations of the variable speed electric motor is in an uncontrollable range; and a step of performing uncontrollable speed range operation for repeatedly and alternately performing a forward direction minimum rotation number instruction for driving the variable speed electric motor at a minimum number of rotations in a forward direction, and a reverse direction minimum rotation number instruction for driving the variable speed electric motor at a minimum number of rotations in a reverse direction, when the calculated number of rotations of the variable speed electric motor is in the uncontrollable range. The transmission device includes: a sun gear which rotates about an axis; a sun gear shaft which is fixed to the sun gear and extends in an axial direction about the axis; a planetary gear which is engaged with the sun gear, revolves about the axis, and rotates about a center line of the planetary gear; an internal gear which has a plurality of teeth arranged about the axis in an annular shape and is engaged with the planetary gear; a planetary gear carrier which has a planetary gear carrier shaft extending in the axial direction about the axis and supports the planetary gear so as to be revolvable about the axis and to be rotatable about the center line of the planetary gear; and an internal gear carrier which has an internal gear carrier shaft extending in the axial direction about the axis and supports the internal gear so as to be rotatable about the axis, wherein among the sun gear shaft, the planetary gear carrier shaft, and the internal gear carrier shaft, one serves as the output shaft connected to the object to be driven, another one serves as a constant speed input shaft, a remaining one serves as a variable speed input shaft. The electric device includes: a constant speed electric motor which has a constant speed rotor connected to the constant speed input shaft of the transmission device; and the variable speed electric motor which has a variable speed rotor connected to the variable speed input shaft of the transmission device and controlling number of rotations in the forward direction and the reverse direction, and has the uncontrollable range in which control in a range between the minimum number of rotations in the forward direction and the minimum number of rotations in the reverse direction is not possible.

According to one or more embodiments of such a configuration, when the number of rotations of the output shaft of the variable speed electric motor system is controlled, it is possible to increase the degree of freedom of the number of rotations. That is, even when the number of rotations is set in the uncontrollable range of the variable speed electric motor, the variable speed electric motor is rotationally driven such that the average number of rotations is the number of rotations, so that the number of rotations of the output shaft can be approximated to a desired number of rotations.

In the control method of the variable speed electric motor system according to one or more embodiments, a ratio of the forward direction minimum rotation number instruction and the reverse direction minimum rotation number instruction is changed, so that the number of rotations of the variable speed electric motor may be controlled.

According to one or more embodiments of the present invention, a control device of a variable speed electric motor system, which includes an electric device for generating rotational driving force and a transmission device for changing a speed of the rotational driving force generated by the electric device and transmits the changed rotational driving force to an object to be driven, wherein, when a number of rotations of a variable speed electric motor calculated based on a number of rotations of an instructed output shaft is in an uncontrollable range, a forward direction minimum rotation number instruction for driving the variable speed electric motor at a minimum number of rotations in a forward direction and a reverse direction minimum rotation number instruction for driving the variable speed electric motor at a minimum number of rotations in a reverse direction are repeatedly and alternately performed. The transmission device includes: a sun gear which rotates about an axis; a sun gear shaft which is fixed to the sun gear and extends in an axial direction about the axis; a planetary gear which is engaged with the sun gear, revolves about the axis, and rotates about a center line of the planetary gear; an internal gear which has a plurality of teeth arranged about the axis in an annular shape and is engaged with the planetary gear; a planetary gear carrier which has a planetary gear carrier shaft extending in the axial direction about the axis and supports the planetary gear so as to be revolvable about the axis and to be rotatable about the center line of the planetary gear; and an internal gear carrier which has an internal gear carrier shaft extending in the axial direction about the axis and supports the internal gear so as to be rotatable about the axis, wherein among the sun gear shaft, the planetary gear carrier shaft, and the internal gear carrier shaft, one serves as the output shaft connected to the object to be driven, another one serves as a constant speed input shaft, and a remaining one serves as a variable speed input shaft. The electric device includes: a constant speed electric motor which has a constant speed rotor connected to the constant speed input shaft of the transmission device; and the variable speed electric motor which has a variable speed rotor connected to the variable speed input shaft of the transmission device and controlling number of rotations in the forward direction and the reverse direction, and has the uncontrollable range in which control in a range between the minimum number of rotations in the forward direction and the minimum number of rotations in the reverse direction is not possible.

According to one or more embodiments of the present invention, when the number of rotations of the output shaft of the variable speed electric motor system is controlled, it is possible to increase the degree of freedom of the number of rotations. That is, even when the number of rotations is set in the uncontrollable range of the variable speed electric motor, the variable speed electric motor is rotationally driven such that the average number of rotations is the number of rotations, so that the number of rotations of the output shaft can be approximated to a desired number of rotations.

DESCRIPTION OF EMBODIMENTS

Hereinafter, a variable speed electric motor system according to one or more embodiments of the present invention is described in detail with reference to the drawings.

Figure 1:
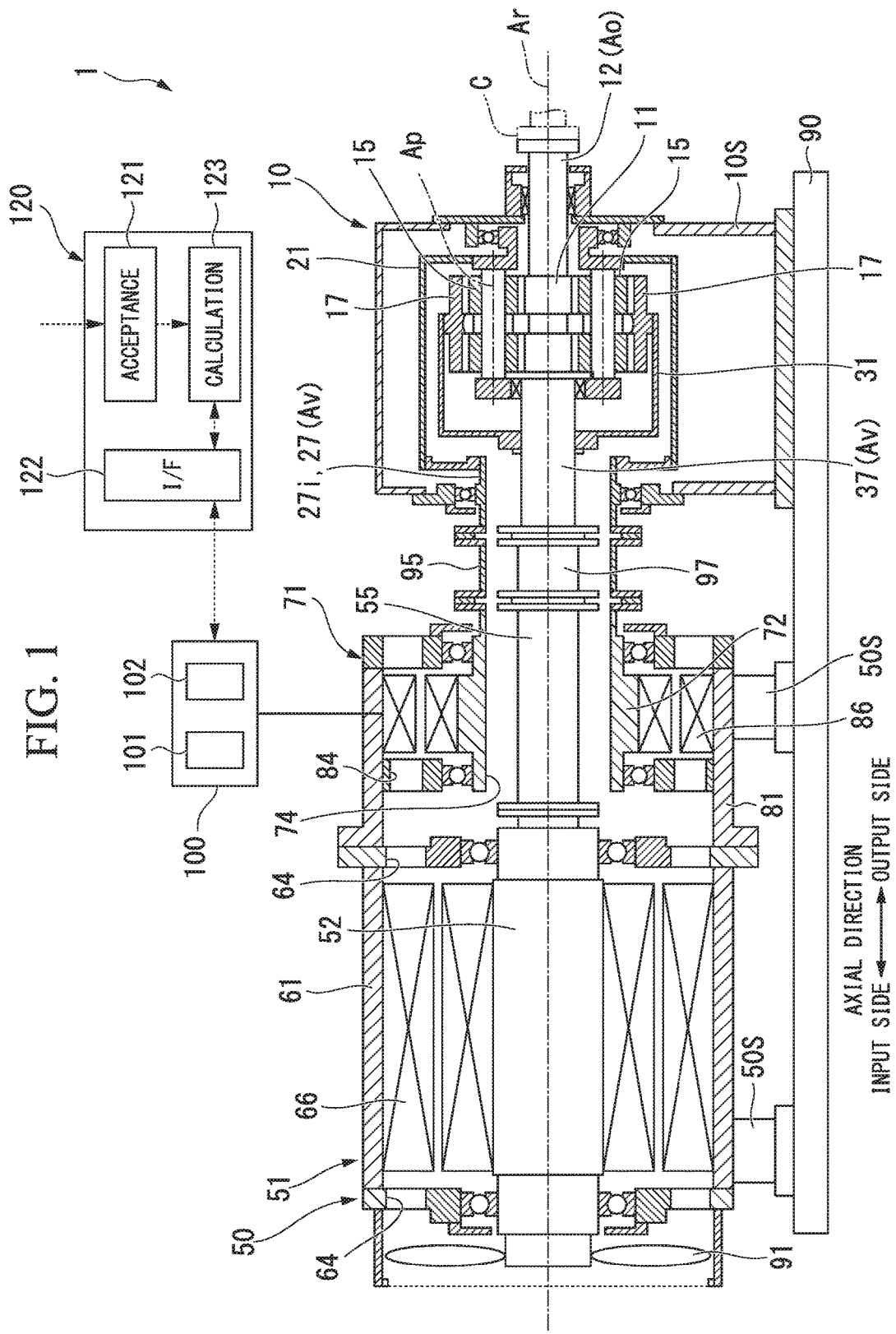
FIG. 1 is a sectional view of a variable speed electric motor system according to one or more embodiments of the present invention.

As illustrated in FIG. 1, a variable speed electric motor system 1 of one or more embodiments includes an electric device 50 that generates rotational driving force, and a transmission device 10 that changes the speed of the rotational driving force generated by the electric device 50 and transmits the result to an object to be driven. The variable speed electric motor system 1, for example, can be applied to a fluid machine system such as a compressor system.

The electric device 50 has a constant speed electric motor 51 that rotationally drives an internal gear carrier shaft 37, which serves as a constant speed input shaft Ac, at a constant speed, and a variable speed electric motor 71 that rotationally drives an input side planetary gear carrier shaft 27i, which serves as a variable speed input shaft Av, at an arbitrary number of rotations. The variable speed electric motor system 1 changes the number of rotations (a rotational speed) of the variable speed electric motor 71 and thus can change the number of rotations of an output shaft Ao of the transmission device 10 connected to the object to be driven.

The electric device 50 is supported on a frame 90 by an electric device support part 50S. The transmission device 10 is supported on the frame 90 by a transmission device support part 10S. By these support parts, it is possible to reliably fix the electric device 50 and the transmission device 10 which are heavy loads.

Figure 2:
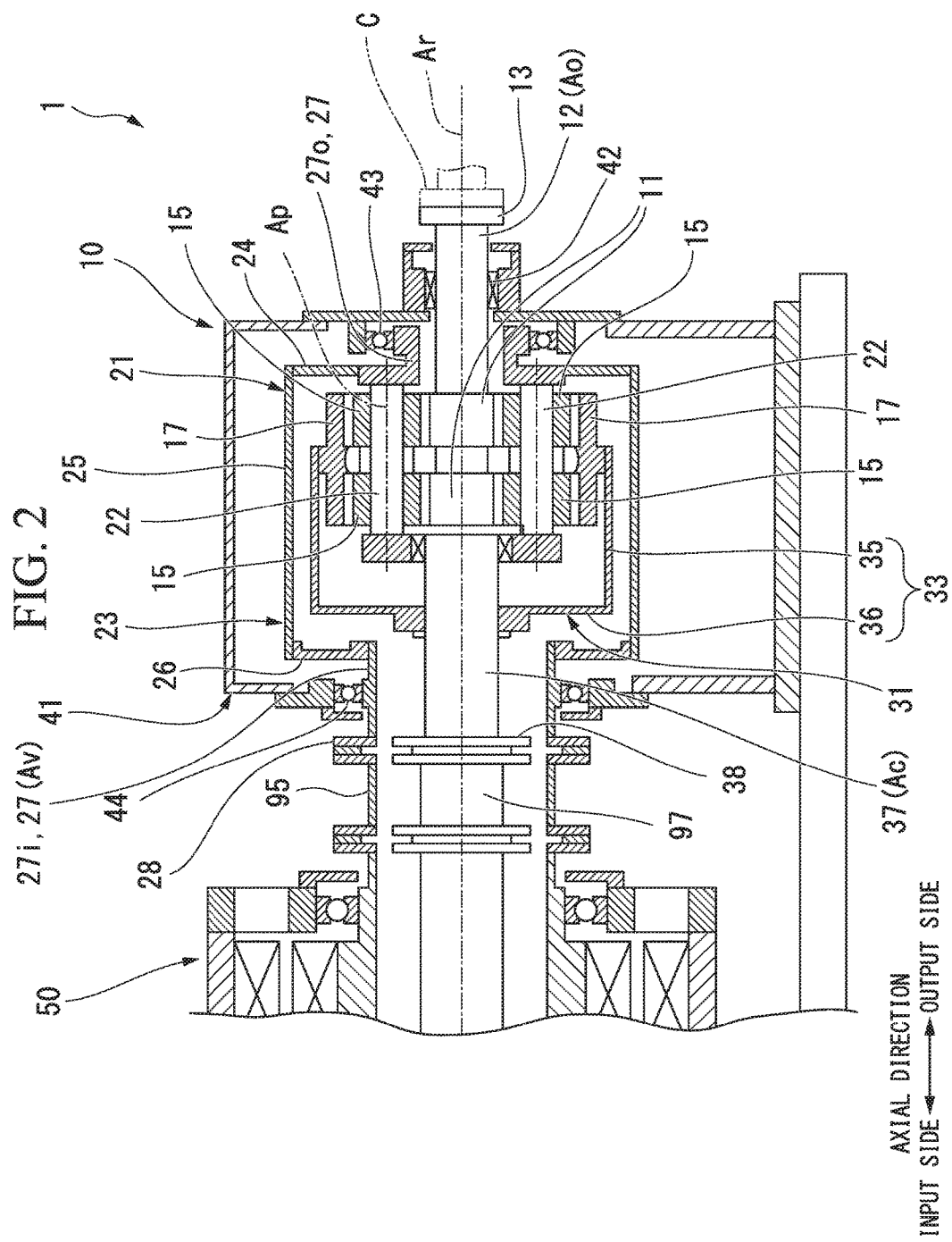
FIG. 2 is a sectional view of a transmission device according to one or more embodiments of the present invention.

The transmission device 10 is a planetary gear transmission device. As illustrated in FIG. 2, the transmission device 10 has a sun gear 11 that rotates about an axis Ar extending in a horizontal direction, a sun gear shaft 12 fixed to the sun gear 11, a plurality of planetary gears 15, an internal gear 17, a planetary gear carrier 21, an internal gear carrier 31, and a transmission casing 41 that covers these elements. Each of the planetary gears 15 is engaged with the sun gear 11, revolves about the axis Ar, and rotates about its own center line Ap, and the internal gear 17 has a plurality of teeth arranged about the axis Ar in an annular shape and is engaged with the plurality of planetary gears 15. The planetary gear carrier 21 supports the plurality of planetary gears 15 so as to be revolvable about the axis Ar and to be rotatable about the center line Ap of the planetary gears 15, and the internal gear carrier 31 supports the internal gear 17 so as to be rotatable about the axis Ar.

Hereinafter, an extension direction of the axis Ar is defined as an axial direction, one side of the axial direction is defined as an output side, and an opposite side of the output side is defined as an input side. Furthermore, a radial direction, in which the axis Ar is employed as a center, is simply defined as a radial direction below.

The sun gear shaft 12 forms a columnar shape about the axis Ar and extends to the output side of the axial direction from the sun gear 11. A flange 13 is formed at an end portion of the output side of the sun gear shaft 12. A rotor of a compressor C serving as an object to be driven, for example, is connected to the flange 13. The sun gear shaft 12 is supported so as to be rotatable about the axis Ar by a sun gear bearing 42 arranged at the output side of the sun gear 11. The sun gear bearing 42 is mounted at the transmission casing 41.

The planetary gear carrier 21 has a planetary gear shaft 22 provided for each of the plurality of planetary gears 15, a carrier body 23 that fixes relative positions of the plurality of planetary gear shafts 22, and a planetary gear carrier shaft 27 fixed to the carrier body 23 and extending in the axial direction about the axis Ar.

The planetary gear shaft 22 passes through the center line Ap of the planetary gear 15 in the axial direction and supports the planetary gear 15 so as to be rotatable about the center line. The carrier body 23 has an output side arm part 24 extending radially outward from the plurality of planetary gear shafts 22, a cylindrical part 25 forming a cylindrical shape about the axis Ar and extending to the input side from an outer end in the radial direction of the output side arm part 24, and an input side arm part 26 extending radially inward from an output side end of the cylindrical part 25.

The planetary gear carrier shaft 27 has an output side planetary gear carrier shaft 27o extending to the output side from the output side arm part 24 and an input side planetary gear carrier shaft 27i extending to the input side from the input side arm part 26. Both of the output side planetary gear carrier shaft 27o and the input side planetary gear carrier shaft 27i form a cylindrical shape about the axis Ar.

The output side planetary gear carrier shaft 27o is supported so as to be rotatable about the axis Ar by a planetary gear carrier bearing 43 arranged at the output side from the output side arm part 24. The planetary gear carrier bearing 43 is mounted at the transmission casing 41. The sun gear shaft 12 is inserted into an inner circumferential side of the output side planetary gear carrier shaft 27o.

The input side planetary gear carrier shaft 27i is supported so as to be rotatable about the axis Ar by a planetary gear carrier bearing 44 arranged at the input side from the input side arm part 26. The planetary gear carrier bearing 44 is mounted at the transmission casing 41. An annular flange 28 widening radially outward is formed at an input side end of the input side planetary gear carrier shaft 27i.

The internal gear carrier 31 has a carrier body 33 to which the internal gear 17 is fixed, and an internal gear carrier shaft 37 fixed to the carrier body 33 and extending in the axial direction about the axis Ar.

The carrier body 33 has a cylindrical part 35, which forms a cylindrical shape about the axis Ar and has an inner circumferential side to which the internal gear 17 is fixed, and an input side arm part 36 extending radially inward from an input side end of the cylindrical part 35.

The internal gear carrier shaft 37 forms a columnar shape about the axis Ar and is arranged at the input side of the sun gear shaft 12 forming a columnar shape about the axis Ar.

The input side arm part 36 of the carrier body 33 is fixed to the internal gear carrier shaft 37. At an input side end of the internal gear carrier shaft 37, an annular or disk-like flange 38 widening radially outward is formed. A part of the input side of the internal gear carrier shaft 37 is inserted into an inner circumferential side of the cylindrical input side planetary gear carrier shaft 27i. The axial direction positions of the flange 38 of the internal gear carrier shaft 37 and the flange 28 of the input side planetary gear carrier shaft 27i approximately coincide with each other.

Figure 3:
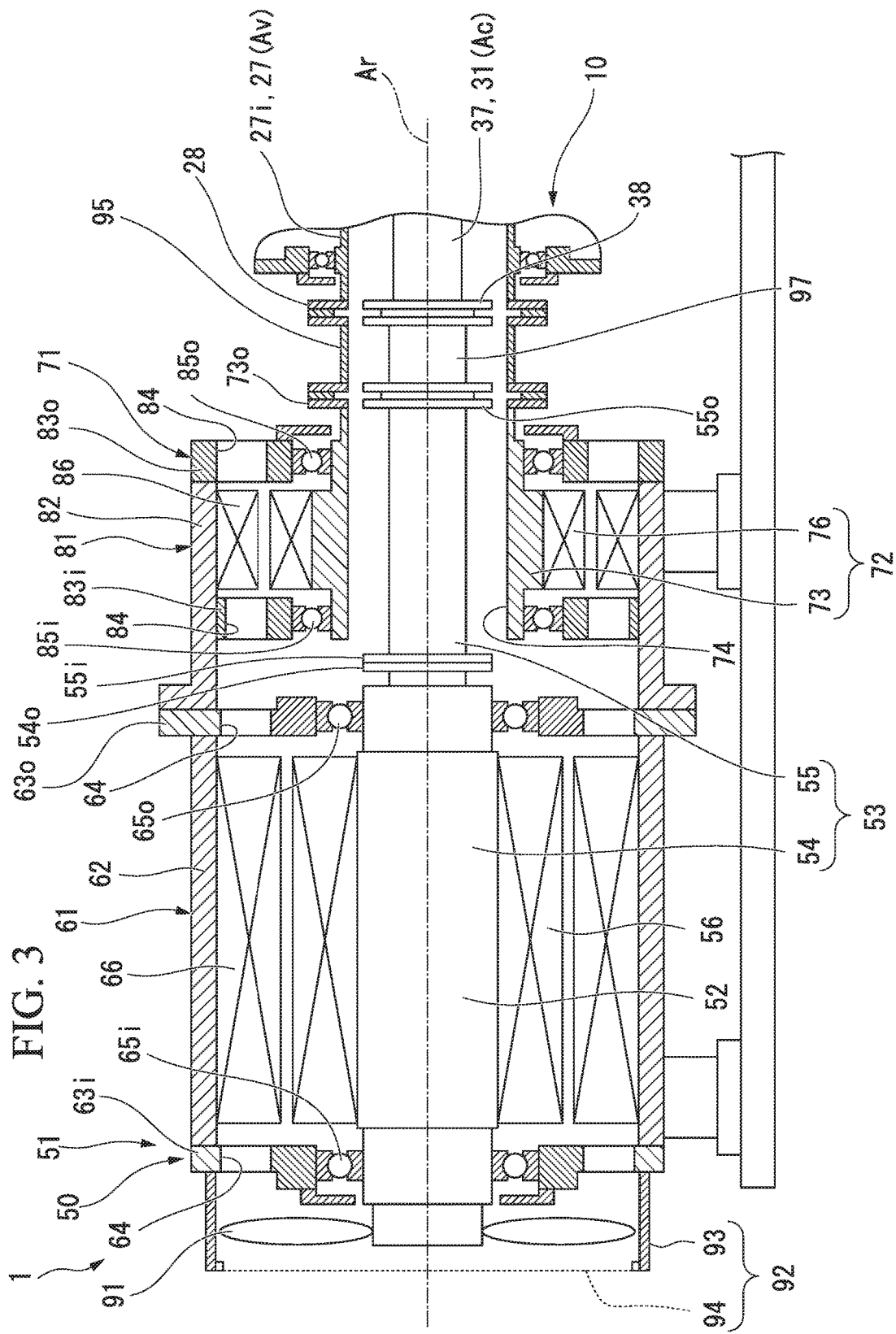
FIG. 3 is a sectional view of an electric device according to one or more embodiments of the present invention.

As illustrated in FIG. 3, the constant speed electric motor 51 rotationally drives the internal gear carrier shaft 37 of the transmission device 10 via a constant speed rotor extension shaft 55. The variable speed electric motor 71 rotationally drives the input side planetary gear carrier shaft 27i of the transmission device 10. The electric device 50 has a cooling fan 91 that cools the constant speed electric motor 51 and the variable speed electric motor 71, and a fan cover 92 that covers the cooling fan 91.

In one or more embodiments, the constant speed electric motor 51, for example, is an induction motor having 3 phases and 4 poles. Furthermore, the variable speed electric motor 71 is an induction motor having 6 poles which is greater than the number of poles of the constant speed electric motor 51. The specifications of the constant speed electric motor 51 and the variable speed electric motor 71 are not limited thereto, and can be appropriately changed.

The constant speed electric motor 51 has a constant speed rotor 52, which rotates about the axis Ar and is connected to the internal gear carrier shaft 37 serving as the constant speed input shaft Ac of the transmission device 10, a constant speed stator 66 arranged at an outer circumferential side of the constant speed rotor 52, and a constant speed electric motor casing 61 having an inner circumferential side to which the constant speed stator 66 is fixed.

The constant speed rotor 52 has a constant speed rotor shaft 53 and a conductor 56 fixed to an outer periphery of the constant speed rotor shaft 53. Furthermore, the constant speed rotor shaft 53 has a constant speed rotor body shaft 54, which forms a columnar shape about the axis Ar and has an outer periphery to which the conductor 56 is fixed, and a constant speed rotor extension shaft 55 which forms a columnar shape about the axis Ar and is fixed to an output side of the constant speed rotor body shaft 54.

At both ends in the axial direction of the constant speed rotor extension shaft 55, annular or disk-like flanges 55i and 55o widening radially outward are respectively formed. At an output side end of the constant speed rotor body shaft 54, an annular or disk-like flange 54o widening radially outward is formed. Since the flanges 55i, 55o, and 54o are connected to one another by a bolt and the like, the constant speed rotor extension shaft 55 and the constant speed rotor body shaft 54 are formed integrally with each other. The cooling fan 91 is fixed to an input side end of the constant speed rotor body shaft 54.

The constant speed stator 66 is arranged radially outward from the conductor 56 of the constant speed rotor 52. The constant speed stator 66 is formed from a plurality of coils.

The constant speed electric motor casing 61 has a casing body 62, which forms a cylindrical shape about the axis Ar and has an inner circumferential side to which the constant speed stator 66 is fixed, and lids 63i and 63o which close both ends in the axial direction of the cylindrical casing body 62. The lids 63i and 63o are respectively mounted with constant speed rotor bearings 65i and 65o that support the constant speed rotor body shaft 54 so as to be rotatable about the axis Ar. Furthermore, each of the lids 63i and 63o is formed with a plurality of openings 64 that pass through the lids 63*i* and 63*o* in the axial direction at positions radially outward from the constant speed rotor bearings 65*i* and 65*o*.

The input side end of the constant speed rotor body shaft 54 protrudes to the input side from the input side lid 63*i* of the constant speed electric motor casing 61. The aforementioned cooling fan 91 is fixed to the input side end of the constant speed rotor body shaft 54. Therefore, when the constant speed rotor 52 rotates, the cooling fan 91 also rotates together with the constant speed rotor 52. The fan cover 92 has a cylindrical cover body 93 arranged at an outer circumferential side of the cooling fan 91, and an air circulation plate 94 mounted at an inlet side opening of the cover body 93 and formed with a plurality of air holes. The fan cover 92 is fixed to the input side lid 63*i* of the constant speed electric motor casing 61.

The variable speed electric motor 71 has a variable speed rotor 72, which rotates about the axis Ar and is connected to the input side planetary gear carrier shaft 27*i* serving as a variable speed input shaft Av, a variable speed stator 86 arranged at an outer circumferential side of the variable speed rotor 72, and a variable speed electric motor casing 81 having an inner circumferential side to which the variable speed stator 86 is fixed.

The variable speed rotor 72 has a variable speed rotor shaft 73, and a conductor 76 fixed to an outer periphery of the variable speed rotor shaft 73. Furthermore, the variable speed rotor shaft 73 is formed with a shaft insertion hole 74 which forms a cylindrical shape about the axis Ar and penetrates in the axial direction. The constant speed rotor extension shaft 55 is inserted into the shaft insertion hole 74 of the variable speed rotor shaft 73. An annular flange 73*o* widening radially outward is formed at an output side end of the variable speed rotor shaft 73. The axial direction positions of the flange 73*o* of the variable speed rotor shaft 73 and the flange 55*o* formed at the output side end of the constant speed rotor extension shaft 55 approximately coincide with each other.

The variable speed stator 86 is arranged radially outward from the conductors 56 and 76 of the variable speed rotor 72. The variable speed stator 86 is formed from a plurality of coils.

The variable speed electric motor casing 81 has a casing body 82, which forms a cylindrical shape about the axis Ar and has an inner circumferential side to which the variable speed stator 86 is fixed, an output side lid 83*o* which closes an output side end of the cylindrical casing body 82, and an inlet side lid 83*i* arranged at the input side from the variable speed stator 86 and fixed to the inner circumferential side of the cylindrical casing body 82. The lids 83*i* and 83*o* are respectively mounted with variable speed rotor bearings 85*i* and 85*o* that support the variable speed rotor shaft 73 so as to be rotatable about the axis Ar. Furthermore, each of the lids 83*i* and 83*o* is formed with a plurality of openings 84 that pass through the lids 83*i* and 83*o* in the axial direction at positions radially outward from the variable speed rotor bearings 85*i* and 85*o*.

As described above, by the plurality of openings 84 formed at the lids 83*i* and 83*o* of the variable speed electric motor casing 81 and the plurality of openings 64 formed at the lids 63*i* and 63*o* of the constant speed electric motor casing 61, a space in the variable speed electric motor casing 81 and a space in the constant speed electric motor casing 61 communicate with each other.

Furthermore, in the variable speed electric motor system 1 of one or more embodiments, the constant speed rotor 52, the variable speed rotor 72, and the sun gear shaft 12 are arranged on the same axis.

The variable speed electric motor system 1 of one or more embodiments further includes a flexible coupling 95 for variable speed, which is arranged between the input side planetary gear carrier shaft 27*i* serving as the variable speed input shaft Av and the variable speed rotor 72 and connects the input side planetary gear carrier shaft 27*i* and the variable speed rotor 72 to each other, and a flexible coupling 97 for constant speed, which is arranged between the internal gear carrier shaft 37 serving as the constant speed input shaft Ac and the constant speed rotor 52 and connects the internal gear carrier shaft 37 and the constant speed rotor 52 to each other.

The variable speed electric motor system 1 includes a rotation number control device 100 that controls the number of rotations of the variable speed electric motor 71 and a control device 120 that controls operations of the rotation number control device 100. The rotation number control device 100 is electrically connected to the variable speed electric motor 71.

The control device 120 is configured with a computer. The control device 120 has an acceptance unit 121, an interface 122, and a calculation unit 123. The acceptance unit 121 directly accepts an instruction from an operator or accepts an instruction from an upper control device, the interface 122 gives an instruction to the rotation number control device 100, and the calculation unit 123 generates an instruction for the rotation number control device 100 in accordance with the instruction and the like accepted by the acceptance unit 121.

The rotation number control device 100 includes a frequency conversion unit 101 that changes a frequency of the power supplied from a power source (not illustrated), and a rotation direction change unit 102 that changes a rotation direction of the variable speed rotor 72.

The frequency conversion unit 101 supplies the variable speed electric motor 71 with power of a frequency instructed from the control device 120. The variable speed rotor 72 of the variable speed electric motor 71 rotates at the number of rotations according to the frequency. As described above, since the frequency of the variable speed rotor 72 is changed, the number of rotations of the planetary gear carrier 21 of the transmission device 10, which is connected to the variable speed rotor 72, is also changed. As a consequence, the number of rotations of the sun gear shaft 12 serving as the output shaft Ao of the transmission device 10 is also changed.

The rotation direction change unit 102 is a unit that changes the rotation direction of the variable speed electric motor 71 by using a circuit that switches a plurality of (3 in the case of one or more embodiments) power lines connected to the variable speed electric motor 71. That is, the rotation direction change unit 102 can rotate the variable speed rotor 72 forward or backward.

Figure 4:
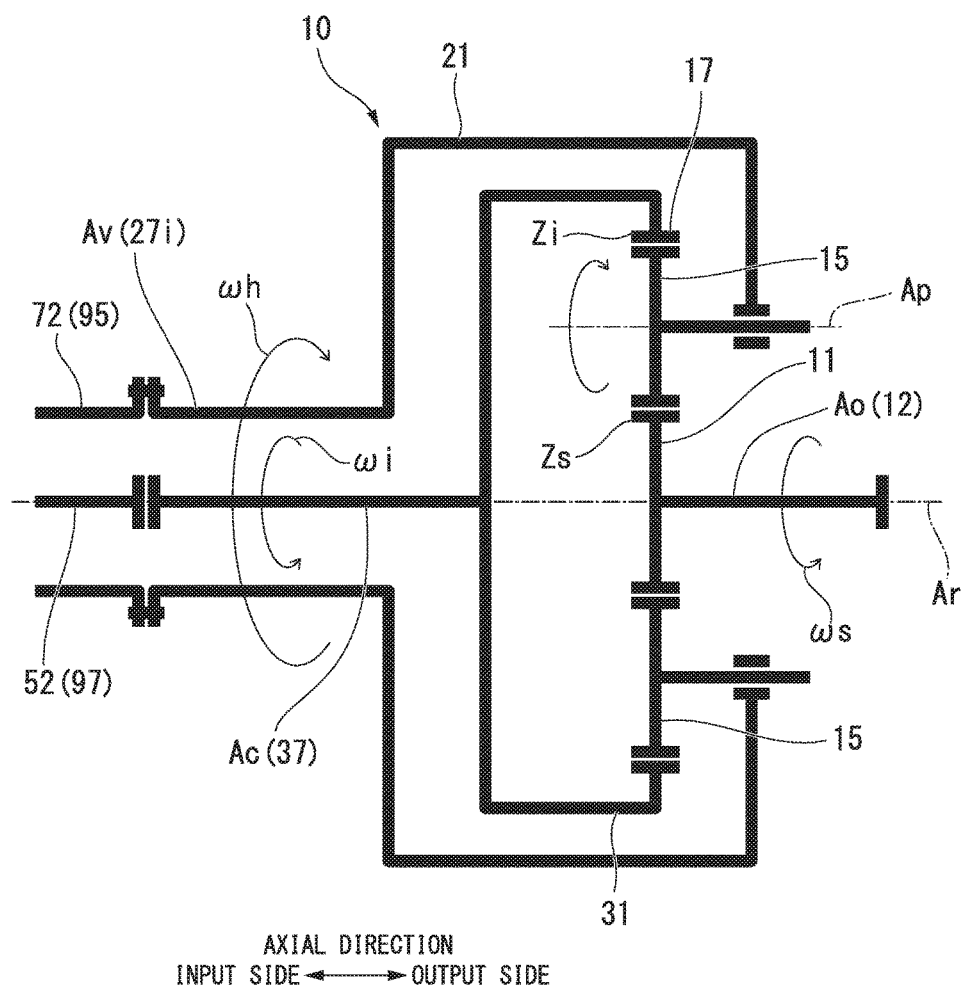
FIG. 4 is a schematic diagram illustrating a configuration of a transmission device according to one or more embodiments of the present invention.

Hereinafter, a relationship between the number of teeth of each gear of the transmission device 10 and the number of rotations of each shaft of the transmission device 10 is described using FIG. 4.

The number of rotations of the sun gear shaft 12 serving as the output shaft Ao is defined as ωs, the number of rotations of the internal gear carrier shaft 37 serving as the constant speed input shaft Ac is defined as ωi, and the number of rotations of the input side planetary gear carrier shaft 27*i* serving as the variable speed input shaft Av is defined as ωh. Furthermore, the number of teeth of the sun gear 11 is defined as Zs and the number of teeth of the internal gear 17 is defined as Zi.

In this case, the relationship between the number of teeth of each gear and the number of rotations of each shaft of the transmission device 10 can be expressed by the following Equation (1).

$$\omega s/\omega i = \omega h/\omega i - (1-\omega h/\omega i) \times Zi/Zs \qquad (1)$$

When the constant speed electric motor 51 is an induction motor having 4 poles and the power supply frequency is 50 Hz, the number ωi of rotations (the rated number of rotations) of the constant speed rotor 52 (the constant speed input shaft Ac) is 1,500 rpm. Furthermore, when the variable speed electric motor 71 is an induction motor having 6 poles and the power supply frequency is 50 Hz, the maximum number ωh of rotations (the rated number of rotations) of the variable speed rotor 72 (the variable speed input shaft Av) is 900 rpm.

Furthermore, the ratio Zi/Zs of the number Zs of teeth of the sun gear 11 and the number Zi of teeth of the internal gear 17 is set to 4.

In this case, when the orientation of the rotation of the constant speed rotor 52 is defined as forward rotation and orientation of the rotation of the variable speed rotor 72 corresponds to the maximum number (−900 rpm) of rotations of the orientation opposite to the rotation of the constant speed rotor 52, the number ωs of rotations of the sun gear shaft 12 serving as the output shaft Ao is −10,500 rpm.

When the orientation of the rotation of the constant speed rotor 52 is defined as the forward rotation and the orientation of the rotation of the variable speed rotor 72 corresponds to the maximum number (900 rpm) of rotations of the same orientation as that of the rotation of the constant speed rotor 52, the number of rotations of the sun gear shaft 12 is −1,500 rpm.

Therefore, when the number of rotations (the rated number of rotations) of the constant speed rotor 52 is +1,500 rpm and the number of rotations of the variable speed rotor 72 can be controlled in a range of 900 rpm (forward rotation) to −900 rpm (backward rotation) by frequency control of the frequency conversion unit 101, the number of rotations of the sun gear shaft 12 serving as the output shaft Ao can be controlled in a range of −1,500 rpm to −10,500 rpm. This range is a variable speed range of the sun gear shaft 12 serving as the output shaft Ao of the variable speed electric motor system 1, and the variable speed electric motor system 1 normally rotates the output shaft Ao in the variable speed range.

When the constant speed electric motor 51 and the variable speed electric motor 71 constituting the electric device 50 have the aforementioned specifications, it is necessary to allow the number of rotations of the variable speed rotor 72 to be 0 rpm in order to allow the number of rotations of the sun gear shaft 12 serving as the output shaft Ao to be −6,000 rpm. In other words, when a variable range of the number of rotations of the variable speed electric motor 71 constituting the variable speed electric motor system 1 is a positive number of rotations to a negative number of rotations, it is necessary to allow the number of rotations of the variable speed electric motor 71 to be 0 rpm according to the number of rotations of the instructed output shaft Ao.

The variable speed electric motor 71 of one or more embodiments is a phase induction motor having 6 poles and it is not possible to control the number of rotations in the vicinity of 0 rpm. In the variable speed electric motor 71 of one or more embodiments, for example, a range of −90 rpm to 90 rpm in which a rated number of rotations is equal to or less than 10%, is an uncontrollable range in which rotation number control is not possible. That is, a minimum number of rotations of the variable speed electric motor 71 of one or more embodiments is 90 rpm. Power supplied to the variable speed electric motor 71 at the minimum number of rotations of 90 rpm is 5 Hz corresponding to 10% of a power supply frequency (50 Hz).

Figure 5:
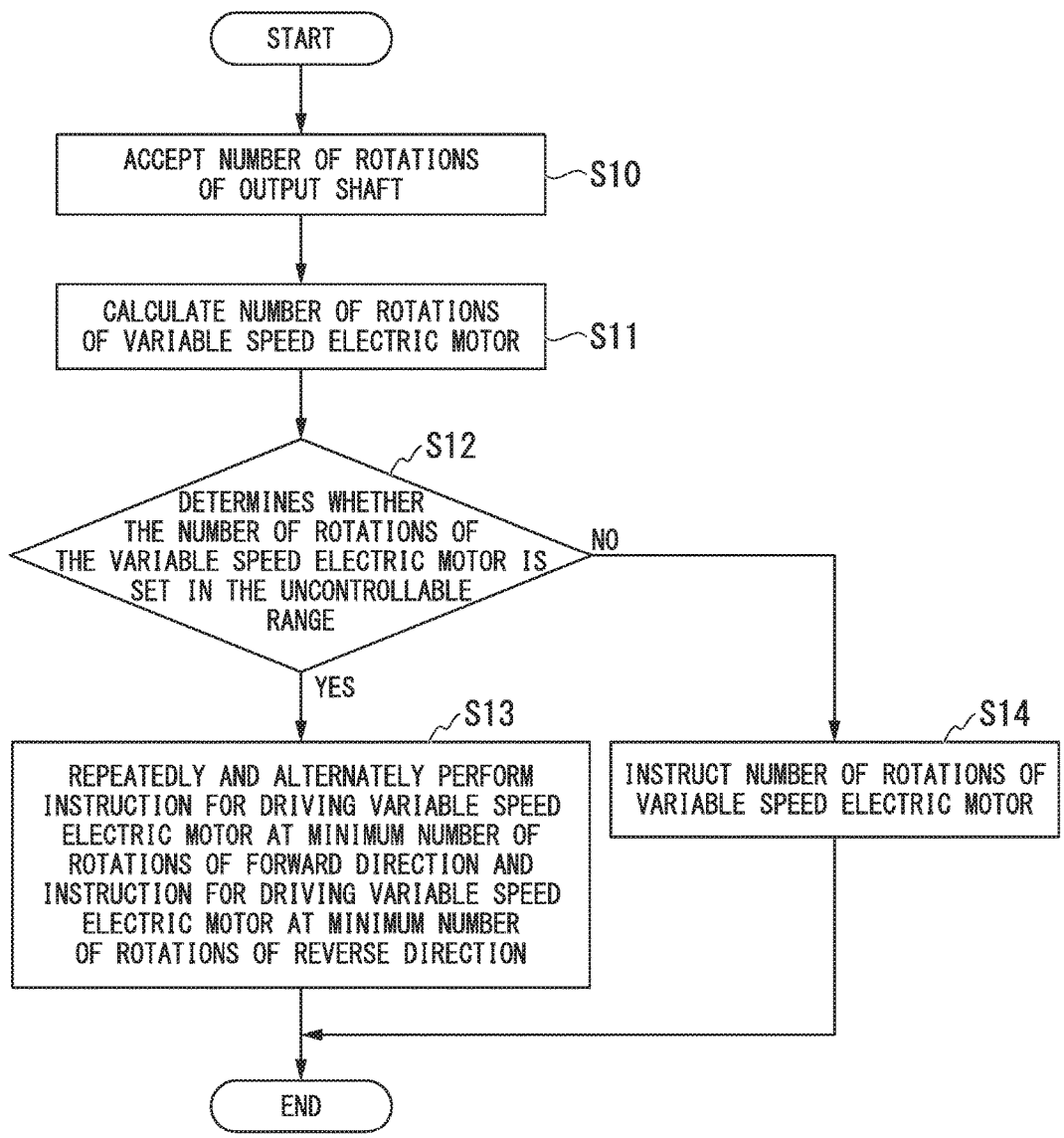
FIG. 5 is a flowchart illustrating an operation of a control device according to one or more embodiments of the present invention.

Next, the control method of the variable speed electric motor system 1 of one or more embodiments is described with reference to a flowchart illustrated in FIG. 5 and the graphs illustrated in FIG. 6 and FIG. 7.

After the start of the variable speed electric motor 71, that is, in a state in which the constant speed electric motor 51 is rotationally driven at the rated number of rotations of 1,500 rpm and the variable speed electric motor 71, for example, is rotationally driven at the minimum number of rotations of 90 rpm, the acceptance unit 121 of the control device 120 accepts an instruction for the number of rotations of the sun gear shaft 12 serving as the output shaft Ao from an exterior (S10). The variable speed range of the output shaft Ao is −1,500 rpm to −10,500 rpm.

When the acceptance unit 121 accepts the instruction for the number of rotations of the output shaft Ao, the calculation unit 123 performs calculation to calculate the number of rotations of the variable speed electric motor 71 corresponding to the number of rotations of the output shaft Ao (S11). That is, the calculation unit 123 calculates the number of rotations of the variable speed electric motor 71 for achieving the number of rotations of the instructed output shaft Ao.

Next, the control device 120 determines whether the calculated number of rotations of the variable speed electric motor 71 is an uncontrollable number of rotations of the variable speed electric motor 71 (S12).

For example, when the number of rotations of the instructed output shaft Ao is −10,500 rpm, a calculation result, which represents that the number of rotations of the variable speed electric motor 71 for allowing the number of rotations of the output shaft Ao to be −10,500 rpm is −900 rpm, is obtained.

Since the −900 rpm is not the uncontrollable number of rotations, the interface 122 instructs the number of rotations of the calculation result to the rotation number control device 100 (S14).

The rotation number control device 100 allows the frequency of power to be supplied to the variable speed electric motor 71 to be 50 Hz corresponding to 900 rpm by using the frequency conversion unit 101, and sets the rotation direction of the variable speed electric motor 71 as a reverse direction by using the rotation direction change unit 102. In this way, the number of rotations of the variable speed electric motor 71 is −900 rpm and the number of rotations of the sun gear shaft 12 is −10,500 rpm.

Next, a description is provided for a control method when the number of rotations of the variable speed electric motor 71 calculated by the calculation unit 123 is in the uncontrollable range of the variable speed electric motor 71.

For example, when the acceptance unit 121 of the control device 120 accepts an instruction for allowing the number of rotations of the sun gear shaft 12 to be −6,000 rpm, the calculation unit 123 performs calculation and calculates a calculation result in which the number of rotations of the variable speed electric motor 71 for allowing the number of rotations of the sun gear shaft 12 to be −6,000 rpm is 0 rpm.

The 0 rpm belongs to the uncontrollable range of the variable speed electric motor 71. That is, the variable speed electric motor 71 is not able to maintain the variable speed rotor 72 at 0 rpm.

When it is determined that the calculation result is in the uncontrollable range of the variable speed electric motor 71, the control device 120 performs uncontrollable speed range operation (S13).

The uncontrollable speed range operation is control for repeatedly and alternately performing a forward direction minimum rotation number instruction P1 (see FIG. 6) for giving an instruction for driving the variable speed electric motor 71 at the minimum number (90 rpm) of rotations in the forward direction, and a reverse direction minimum rotation number instruction for giving an instruction for driving the variable speed electric motor 71 at the minimum number of rotations in the reverse direction. By this control, the number of rotations of the variable speed electric motor 71 is approximated to a speed in the vicinity of 0 rpm.

Figure 6:
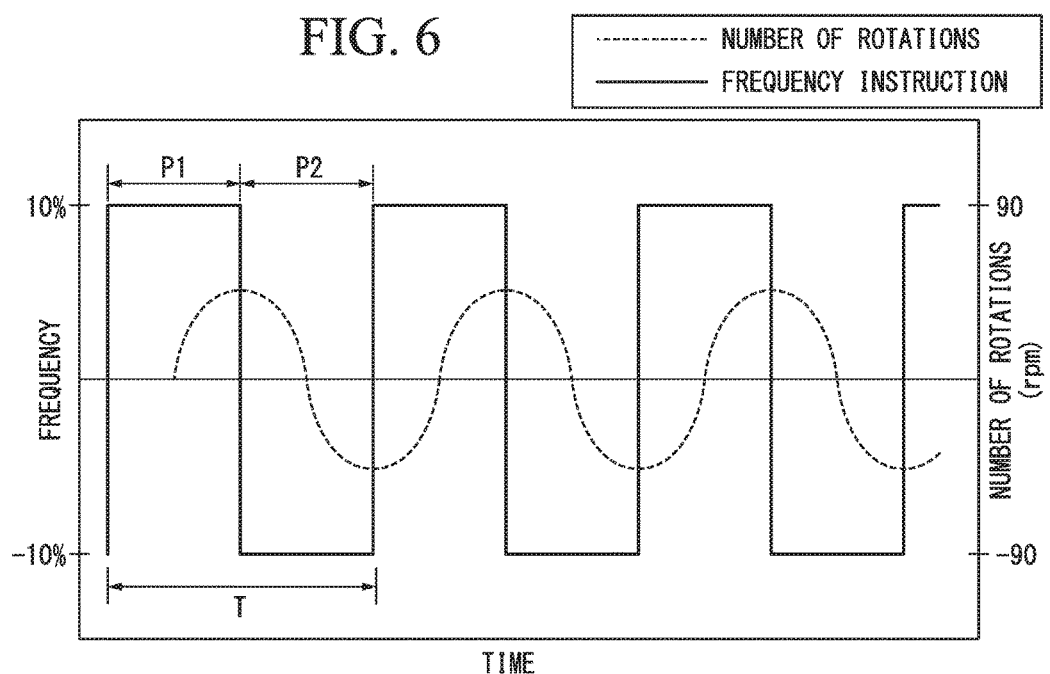
FIG. 6 is a graph illustrating a rotation number instruction value in an uncontrollable speed range operation of a variable speed electric motor according to one or more embodiments of the present invention.
Figure 7:
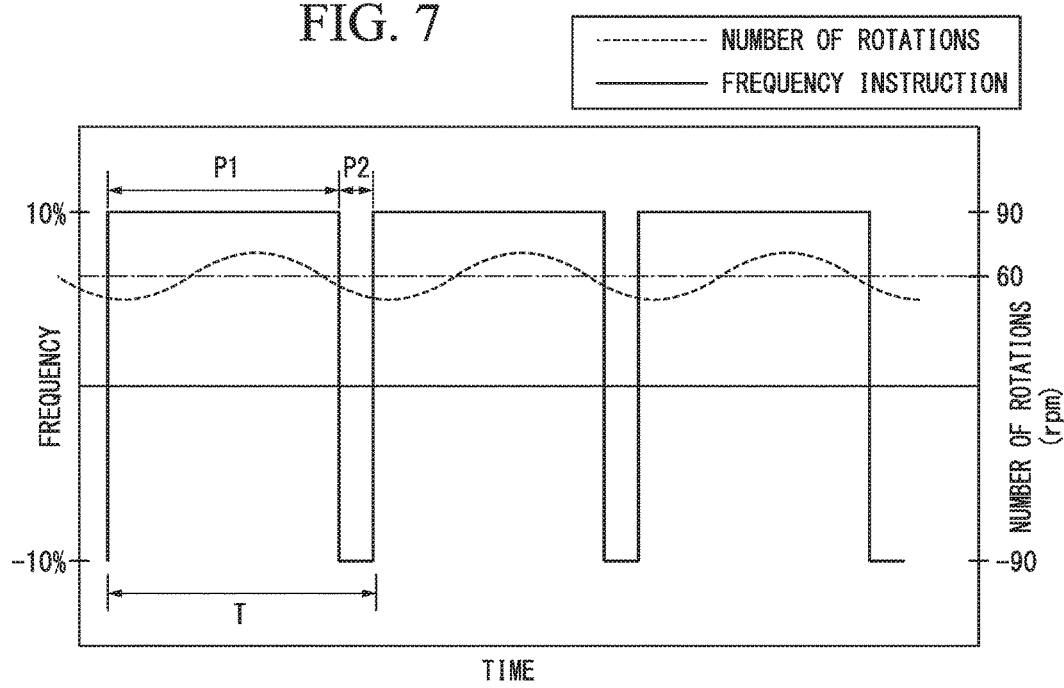
FIG. 7 is a graph illustrating a rotation number instruction value in an uncontrollable speed range operation of a variable speed electric motor according to one or more embodiments of the present invention.

FIG. 6 and FIG. 7 are graphs in which a horizontal axis is defined as a time and a vertical axis is defined as a frequency (a ratio for 50 Hz and indicated by a "−" sign in the case of the backward rotation) supplied to the variable speed electric motor 71 and the number of rotations of the variable speed electric motor 71.

As illustrated in FIG. 6, when the uncontrollable speed range operation is performed, the interface 122 repeatedly and alternately gives, to the rotation number control device 100, a command for rotating the variable speed rotor 72 forward at a frequency of 5 Hz (10% of the power supply frequency) and a command for rotating the variable speed rotor 72 backward at the frequency of 5 Hz. A period T including the forward direction minimum rotation number instruction P1 and the subsequent reverse direction minimum rotation number instruction P2 is constant.

In the period T, times (pulse widths) of the forward direction minimum rotation number instruction P1 and the reverse direction minimum rotation number instruction P2 are equal to each other. In this way, the number of rotations of the variable speed electric motor 71 is changed in a sign curve shape as indicated by a dashed line. That is, the variable speed electric motor 71 repeats forward rotation and backward rotation.

The times of the forward direction minimum rotation number instruction P1 and the reverse direction minimum rotation number instruction P2 are allowed to be equal to each other, so that an average of the number of rotations can be 0 rpm. That is, it is possible to approximate to the number of rotations of 0 rpm while rotating the variable speed rotor 72.

Next, a description is provided for a control method when the number of rotations of the variable speed electric motor 71 is in the uncontrollable range and is not 0 rpm.

When the instructed number of rotations of the output shaft Ao is −5,700 rpm, the number of rotations of the variable speed electric motor 71 calculated by the calculation unit 123 is 60 rpm. Since the 60 rpm is in the uncontrollable range of the variable speed electric motor 71, the control device 120 performs the uncontrollable speed range operation (S13).

As illustrated in FIG. 7, in order to approximate to 60 rpm, the control device 120 allows the times of the forward direction minimum rotation number instruction P1 and the reverse direction minimum rotation number instruction P2 to be different from each other. Specifically, the control device 120 lengthens the time of the forward direction minimum rotation number instruction P1 and shortens the time of the reverse direction minimum rotation number instruction P2 such that an average value of the number of rotations of the variable speed electric motor 71 is 60 rpm.

For example, when P1:P2=5:5, the number of rotations can be approximated to 0 rpm, and when P1:P2=100, the number of rotations is 90 rpm. As described above, the ratio of the forward direction minimum rotation number instruction P1 and the reverse direction minimum rotation number instruction P2 is changed, so that it is possible to approximate to the number of rotations of the uncontrollable range. When the ratio of the forward direction minimum rotation number instruction P1 is increased, the approximate number of rotations (the average number of rotations of the variable speed electric motor 71) of the variable speed electric motor 71 is approximated to 90 rpm, and when the reverse direction minimum rotation number instruction P2 is increased, the approximate number of rotations of the variable speed electric motor 71 is approximated to −90 rpm.

According to one or more embodiments, when controlling the number of rotations of the output shaft of the variable speed electric motor system 1 including the electric device 50, which has the constant speed electric motor 51 and the variable speed electric motor 71, and the planetary gear transmission device 10 that changes the speed of the rotational driving force generated by the electric device 50 and transmits the result to an object to be driven, it is possible to increase the degree of freedom of the number of rotations.

That is, even when the number of rotations is set in the uncontrollable range of the variable speed electric motor 71, the variable speed electric motor 71 is rotationally driven such that the average number of rotations is the number of rotations, so that the number of rotations of the output shaft can be approximated to a desired number of rotations.

The uncontrollable speed range operation is more effective when V/F control (VVVF control) is performed in variable speed control of an induction motor. In general, the V/F control has an advantage that torque ripple is small as compared with vector control and DTC (direct torque control) control, but has a disadvantage that the uncontrollable range of the electric motor becomes large. When the uncontrollable speed range operation of one or more embodiments is used, it is possible to enlarge a control range of the variable speed electric motor even though the V/F control is performed.

Furthermore, in one or more embodiments, since the constant speed rotor 52 of the constant speed electric motor 51 and the variable speed rotor 72 of the variable speed electric motor 71 are arranged on the axis Ar of the transmission device 10, even when the constant speed rotor 52 and the variable speed rotor 72 are arranged at positions separated radially from the axis Ar of the transmission device 10, it is possible to achieve miniaturization as a whole. Moreover, in one or more embodiments, since it is not necessary to provide a transfer mechanism such as a belt and a pulley as with a case where the constant speed rotor 52 and the variable speed rotor 72 are arranged at positions separated radially from the axis Ar of the transmission device 10, it is possible to miniaturize the device from this standpoint and to further reduce the manufacturing cost by a reduction of the number of parts. Furthermore, in one or more embodiments, since it is not necessary to provide a transfer mechanism such as a belt and a pulley as with a case where the constant speed rotor 52 and the variable speed rotor 72 are arranged at positions separated radially from the axis Ar of the transmission device 10, it is also possible to reduce vibration regardless of a bending load from the belt and the like with respect to a shaft positioned on the axis Ar of the transmission device 10.

In one or more embodiments, the constant speed rotor 52 of the electric device 50 and the constant speed input shaft Ac of the transmission device 10 are connected to the flexible coupling 97 for constant speed, so that it is possible to permit eccentricity, declination, and deviation between the constant speed rotor 52 and the constant speed input shaft Ac. Moreover, in one or more embodiments, the variable speed rotor 72 of the electric device 50 and the variable speed input shaft Av of the transmission device 10 are connected to the flexible coupling 95 for variable speed, so that it is possible to permit eccentricity, declination, and deviation between the variable speed rotor 72 and the variable speed input shaft Av. Therefore, in one or more embodiments, it is possible to minimize time and effort of centering work of the transmission device 10 with respect to the electric device 50, and to suppress transfer of axis deflection to the transmission device 10 from the electric device 50 and transfer of axis deflection to the electric device 50 from the transmission device 10.

In one or more embodiments, the variable speed electric motor casing 81 is fixed to the constant speed electric motor casing 61. Therefore, in one or more embodiments, it is possible to accurately perform positioning (centering) of the variable speed rotor 72 with respect to the constant speed rotor 52 before the shipment of a variable electric motor system from a manufacturing factory. Thus, in one or more embodiments, it is possible to omit positioning work of the variable speed rotor 72 with respect to the constant speed rotor 52 in an installation site.

In one or more embodiments, when the constant speed rotor 52 rotates, the cooling fan 91 provided to the end of the constant speed rotor 52 also rotates. With the rotation of the cooling fan 91, external air is introduced into the constant speed electric motor casing 61, so that the constant speed rotor 52, the constant speed stator 66 and the like are cooled. Moreover, in one or more embodiments, since the constant speed electric motor casing 61 and the variable speed electric motor casing 81 communicate with each other, the air introduced into the constant speed electric motor casing 61 is also introduced into the variable speed electric motor casing 81, so that the variable speed rotor 72, the variable speed stator 86 and the like are cooled. Thus, in one or more embodiments, it is possible to cool the two generators by using the cooling fan 91 and to miniaturize the device and reduce the manufacturing cost from the standpoint.

Furthermore, in one or more embodiments, the constant speed rotor 52, the variable speed rotor 72, and the sun gear shaft 12 are arranged on the same axis, so that it is possible to reduce an installation space of the variable electric motor system. Furthermore, since parts (a bevel gear and the like) for transferring rotation are not necessary, it is possible to suppress an increase in the number of parts and to reduce the manufacturing cost.

Furthermore, in one or more embodiments, the rod-like constant speed rotor shaft 53 (the constant speed rotor extension shaft 55) is inserted into the cylindrical variable speed rotor shaft 73 formed with the shaft insertion hole 74. That is, the constant speed rotor shaft 53 of the constant speed electric motor 51 with high output power is inserted into the variable speed rotor shaft 73 of the variable speed electric motor 71 with output power smaller than that of the constant speed electric motor 51. In this way, it is possible to employ an electric motor with higher output power (horse power) as the constant speed electric motor 51.

Furthermore, in one or more embodiments, the constant speed electric motor 51, the variable speed electric motor 71, the transmission device, and the compressor C are arranged on a linear line in this order, so that it is possible to achieve compactification of the whole device.

In addition, in the aforementioned embodiments, the constant speed rotor 52, the variable speed rotor 72, and the sun gear shaft 12 are arranged on the same axis; however, the present invention is not limited thereto. For example, the variable speed electric motor 71 may be arranged such that the axis of the variable speed rotor 72 is parallel to the axis of the constant speed rotor 52 and is located at a position different from that of the axis of the constant speed rotor 52.

Furthermore, in the variable speed electric motor systems of the aforementioned embodiments, the compressor C is employed as an object to be driven and is rotated at a high speed equal to more than 7,500 rpm. In the variable speed electric motor systems of the aforementioned each embodiment, since the object to be driven is rotated at a high speed as described above, the number of rotations of the constant speed electric motor 51 is accelerated by the transmission device 10. Therefore, in the transmission device 10 of the aforementioned embodiments, the sun gear shaft 12 serves as the output shaft Ao, the internal gear carrier shaft 37 serves as the constant speed input shaft Ac, and the input side planetary gear carrier shaft 27i serves as the variable speed input shaft Av.

However, the transmission device in the present invention, for example, may decelerate the number of rotations of the constant speed electric motor 51. In this case, the sun gear shaft 12 may serve as the constant speed input shaft Ac, the planetary gear carrier shaft 27 may serve as the variable speed input shaft Av, and the internal gear carrier shaft 37 may serve as the output shaft Ao. Furthermore, for example, the sun gear shaft 12 may serve as the output shaft Ao similarly to the above embodiments, the internal gear carrier shaft 37 may serve as the variable speed input shaft Av, and the planetary gear carrier shaft 27 may serve as the constant speed input shaft Ac. As described above, whether any one of the sun gear shaft 12, the planetary gear carrier shaft 27, and the internal gear carrier shaft 37 serves as the output shaft Ao, another one serves as the constant speed input shaft Ac, and the other one serves as the variable speed input shaft Av is appropriately set according to whether to accelerate output with respect to input, a change range of acceleration/deceleration of the output, and the like.

Furthermore, in the aforementioned embodiments, an induction motor having 4 poles is exemplified as a constant speed electric motor 51 in order to rotate the compressor C at a high speed, and an induction motor having 6 poles is exemplified as a variable speed electric motor 71 in order to change the number of rotations of the compressor C in a constant range. However, when it is not necessary to rotate an object to be driven at a high speed, other types of electric motors may be used as the constant speed electric motor 51 and the variable speed electric motor 71.

Furthermore, in the aforementioned embodiments, the shaft insertion hole 74 is formed at the variable speed rotor 72 and the constant speed rotor 52 is inserted into the shaft insertion hole 74; however, it may be possible to employ a configuration in which the shaft insertion hole is formed at the constant speed rotor and the variable speed rotor is inserted into the shaft insertion hole.

Furthermore, in the aforementioned embodiments, the flexible coupling 95 for variable speed, which connects the variable speed rotor 72 and the variable speed input shaft Av to each other, serves as a first flexible coupling and the flexible coupling 97 for constant speed, which connects the constant speed rotor 52 and the constant speed input shaft Ac to each other, serves as a second flexible coupling. However, when the flexible coupling for constant speed is arranged at the outer circumferential side of the flexible coupling for variable speed, the flexible coupling for constant speed serves as the first flexible coupling and the flexible coupling for variable speed serves as the second flexible coupling.

INDUSTRIAL APPLICABILITY

In one or more embodiments of the present invention, it is possible to increase the degree of freedom of a variable speed range of the variable speed electric motor system.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

REFERENCE SIGNS LIST

1 Variable speed electric motor system
10 Transmission device (planetary gear transmission device)
11 Sun gear
12 Sun gear shaft
15 Planetary gear
17 Internal gear
21 Planetary gear carrier
22 Planetary gear shaft
23 Carrier body
27 Planetary gear carrier shaft
27i Input side planetary gear carrier shaft
28 Flange
31 Internal gear carrier
33 Carrier body
37 Internal gear carrier shaft
38 Flange
41 Transmission casing
50 Electric device
51 Constant speed electric motor
52 Constant speed rotor
53 Constant speed rotor shaft
54 Constant speed rotor body shaft
55 Constant speed rotor extension shaft
56 Conductor
61 Constant speed electric motor casing
62 Casing body
63i, 63o Lid
64 Opening
66 Constant speed stator
71 Variable speed electric motor
71S Variable speed electric motor support part
72 Variable speed rotor
73 Variable speed rotor shaft
73o Flange
74 Shaft insertion hole
76 Conductor
81 Variable speed electric motor casing
82 Casing body
83i, 83o Lid
84 Opening
86 Variable speed stator
91 Cooling fan
100 Rotation number control device
101 Frequency conversion unit
102 Rotation direction change unit
116 Carrier body
117 Transfer part
118 Carrier shaft gear
119 Carrier body gear
120 Control device
Ap Center line
Ar Axis

The invention claimed is:

1. A control method of a variable speed electric motor system comprising an electric device that generates rotational driving force and a transmission device that changes a speed of the rotational driving force generated by the electric device and transmits the changed rotational driving force to an object to be driven, the control method comprising:
accepting an instruction for a number of rotations of an output shaft;
calculating a number of rotations of a variable speed electric motor based on the number of rotations of the output shaft;
determining whether the calculated number of rotations of the variable speed electric motor is in an uncontrollable range; and
performing uncontrollable speed range operation comprising repeatedly and alternately performing a forward direction minimum rotation number instruction that drives the variable speed electric motor at a minimum number of rotations in a forward direction, and a reverse direction minimum rotation number instruction that drives the variable speed electric motor at a minimum number of rotations in a reverse direction, when the calculated number of rotations of the variable speed electric motor is in the uncontrollable range,
wherein the transmission device comprises:
a sun gear that rotates about an axis;
a sun gear shaft that is fixed to the sun gear and extends in an axial direction about the axis;
a planetary gear that is engaged with the sun gear, revolves about the axis, and rotates about a center line of the planetary gear;
an internal gear that comprises a plurality of teeth arranged about the axis in an annular shape and is engaged with the planetary gear;
a planetary gear carrier that comprises a planetary gear carrier shaft extending in the axial direction about the axis and supports the planetary gear to be revolvable about the axis and to be rotatable about the center line of the planetary gear; and
an internal gear carrier that comprises an internal gear carrier shaft extending in the axial direction about the axis and supports the internal gear to be rotatable about the axis,
wherein among the sun gear shaft, the planetary gear carrier shaft, and the internal gear carrier shaft, one serves as the output shaft connected to the object to be driven, another one serves as a constant speed input shaft, a remaining one serves as a variable speed input shaft, and
wherein the electric device comprises:
a constant speed electric motor that comprises a constant speed rotor connected to the constant speed input shaft of the transmission device; and
the variable speed electric motor that comprises a variable speed rotor connected to the variable speed input shaft of the transmission device and controls a number of rotations in the forward direction and the reverse direction, and has the uncontrollable range in which control is not possible in a range between the minimum number of rotations in the forward direction and the minimum number of rotations in the reverse direction.

2. The control method of the variable speed electric motor system according to claim 1, wherein a ratio of the forward direction minimum rotation number instruction and the reverse direction minimum rotation number instruction is changed, so that the number of rotations of the variable speed electric motor is approximated in the uncontrollable range.

3. A control device of a variable speed electric motor system comprising an electric device that generates rotational driving force and a transmission device that changes a speed of the rotational driving force generated by the electric device and transmits the changed rotational driving force to an object to be driven, wherein when a number of rotations of a variable speed electric motor calculated based on a number of rotations of an instructed output shaft is in an uncontrollable range, a forward direction minimum rotation number instruction for driving the variable speed electric motor at a minimum number of rotations in a forward direction and a reverse direction minimum rotation number instruction for driving the variable speed electric motor at a minimum number of rotations in a reverse direction are repeatedly and alternately performed, wherein the transmission device comprises:

a sun gear that rotates about an axis;

a sun gear shaft that is fixed to the sun gear and extends in an axial direction about the axis;

a planetary gear that is engaged with the sun gear, revolves about the axis, and rotates about a center line of the planetary gear;

an internal gear that comprises a plurality of teeth arranged about the axis in an annular shape and is engaged with the planetary gear;

a planetary gear carrier that comprises a planetary gear carrier shaft extending in the axial direction about the axis and supports the planetary gear so as to be revolvable about the axis and to be rotatable about the center line of the planetary gear; and an internal gear carrier that comprises an internal gear carrier shaft extending in the axial direction about the axis and supports the internal gear so as to be rotatable about the axis, wherein among the sun gear shaft, the planetary gear carrier shaft, and the internal gear carrier shaft, one serves as the output shaft connected to the object to be driven, another one serves as a constant speed input shaft, and a remaining one serves as a variable speed input shaft, and wherein the electric device comprises:

a constant speed electric motor that comprises a constant speed rotor connected to the constant speed input shaft of the transmission device; and the variable speed electric motor that comprises a variable speed rotor connected to the variable speed input shaft of the transmission device and controlling number of rotations in the forward direction and the reverse direction, and has the uncontrollable range in which control is not possible in a range between the minimum number of rotations in the forward direction and the minimum number of rotations in the reverse direction.

* * * * *